United States Patent
Featherston et al.

(10) Patent No.: US 12,284,122 B1
(45) Date of Patent: *Apr. 22, 2025

(54) CIRCUIT AND METHOD FOR RESOURCE ARBITRATION

(71) Applicant: Marvell Asia Pte Ltd, Singapore (SG)

(72) Inventors: Joseph Featherston, Boston, MA (US); Aadeetya Shreedhar, Natick, MA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/434,294

(22) Filed: Feb. 6, 2024

Related U.S. Application Data

(63) Continuation of application No. 17/932,084, filed on Sep. 14, 2022, now Pat. No. 11,929,940.

(60) Provisional application No. 63/395,947, filed on Aug. 8, 2022.

(51) Int. Cl.
    *G06F 13/36* (2006.01)
    *H04L 47/783* (2022.01)
    *H04L 47/80* (2022.01)

(52) U.S. Cl.
    CPC .......... *H04L 47/783* (2013.01); *H04L 47/805* (2013.01)

(58) Field of Classification Search
    CPC .......................... H04L 47/783; H04L 47/805
    See application file for complete search history.

(56) References Cited

U.S. PATENT DOCUMENTS

| 6,052,375 A | * | 4/2000 | Bass ................ H04L 47/6225 370/230.1 |
| 7,143,219 B1 | | 11/2006 | Chaudhari et al. |
| 7,739,436 B2 | | 6/2010 | Meyer |

(Continued)

FOREIGN PATENT DOCUMENTS

| GB | 2605282 A | * | 9/2022 | ........... G06F 13/362 |
| JP | 06324958 A | * | 11/1994 | ............. G06F 13/00 |

OTHER PUBLICATIONS

Fusella, et al., "Understanding Turn Models for Adaptive Routing: the Modular Approach," Design, Automation and Test in Europe (2018) 1489-1492.

(Continued)

*Primary Examiner* — Cheng Yuan Tseng
(74) *Attorney, Agent, or Firm* — Hamilton, Brook, Smith & Reynolds, P.C.

(57) ABSTRACT

A circuit and corresponding method perform resource arbitration. The circuit comprises a pending arbiter (PA) that outputs a PA selection for accessing a resource. The PA selection is based on PA input. The PA input represents respective pending-state of requesters of the resource. The circuit further comprises a valid arbiter (VA) that outputs a VA selection for accessing the resource. The VA selection is based on VA input. The VA input represents respective valid-state of the requesters. The circuit performs a validity check on the PA selection output. The circuit outputs a final selection for accessing the resource by selecting, based on the validity check performed, the PA selection output or VA selection output. The circuit addresses arbitration fairness issues that may result when multiple requesters are arbitrating to be selected for access to a shared resource and such requesters require a credit (token) to be eligible for arbitration.

38 Claims, 7 Drawing Sheets

(56) References Cited

U.S. PATENT DOCUMENTS

| | | | |
|---|---|---|---|
| 8,467,213 | B1 | 6/2013 | Channabasappa |
| 11,507,436 | B2 * | 11/2022 | Van Benthem ......... G06F 9/526 |
| 11,769,832 | B2 | 9/2023 | Han et al. |
| 11,929,940 | B1 * | 3/2024 | Featherston .......... H04L 47/805 |
| 2009/0316700 | A1 | 12/2009 | White et al. |
| 2012/0144064 | A1 | 6/2012 | Parker et al. |
| 2012/0215976 | A1 | 8/2012 | Inoue |
| 2013/0322459 | A1 | 12/2013 | Xu |
| 2015/0006776 | A1 | 1/2015 | Liu et al. |
| 2015/0188847 | A1 | 7/2015 | Chopra et al. |
| 2017/0063625 | A1 | 3/2017 | Philip et al. |
| 2017/0195295 | A1 | 7/2017 | Tatlicioglu et al. |
| 2018/0301201 | A1 | 10/2018 | Kantipudi |
| 2021/0385164 | A1 | 12/2021 | Parmar et al. |
| 2023/0085669 | A1 * | 3/2023 | Van Benthem ......... G06F 9/526 718/104 |
| 2023/0102680 | A1 * | 3/2023 | Kanayama ............ G06F 3/0659 711/154 |
| 2023/0315898 | A1 | 10/2023 | Alaeddini |
| 2023/0316334 | A1 | 10/2023 | Vankayala |
| 2024/0048508 | A1 | 2/2024 | Viego et al. |

OTHER PUBLICATIONS

Glass, et al., "The Turn Model for Adaptive Routing," Advanced Computer Systems Laboratory, 1992, 278-287.

Next Hop Definition, Created Nov. 17, 2005, Retrieved from the Internet at http://www.linfo.org/next_hop.html on Sep. 15, 2022, The Linux Information Project.

No. U.S. Appl. No. 17/934,017, entitled "Directional Link Credit-Based Packet Transmission," filed Sep. 21, 2022.

U.S. Appl. No. 18/154,314, entitled "Mixed-Dimension Order Routing," filed Jan. 13, 2023.

No. U.S. Appl. No. 18/299,397, entitled "Selective Mesh Routing Through Non-adjacent Nodes," filed Apr. 12, 2023.

U.S. Appl. No. 18/320,713, entitled "Circuit and Method with Weight-Based Arbitration," filed May 19, 2023.

U.S. Appl. No. 18/320,738, entitled "Circuit and Method for Dynamic-Weight Based Arbitration," filed May 19, 2023.

U.S. Appl. No. 18/320,779, entitled "Circuit and Method with Vector-Based Arbitration," filed May 19, 2023.

Wikipedia, "Mesh Interconnect Architecture—Intel," Retrieved from the Internet on Nov. 23, 2022 at https://en.wikipedia.org/wiki/Turn_restriction_routing.

Wikipedia, "Turn restriction routing," Retrieved from the Internet on Nov. 23, 2022 at https://en.wikichip.org/wiki/intel/mesh_interconnect_architecture.

Lee, et al., "Probabilistic Distance-based Arbitration: Providing Equality of Service for Many-core CMPs," 2010 43rd Annual IEEE/ACM International Symposium on Microarchitecture, pp. 509-519.

Mandal, et al., "Theoretical Analysis and Evaluation of NoCs with Weighted Round-Robin Arbitration," Dept. of ECE, University of Wisconsin-Madison, Aug. 21, 2021.

U.S. Appl. No. 18/328,542 entitled "Single Cycle Request Arbiter," filed Jun. 2, 2023.

Khan, et al., "Design of a Round Robin Arbiter On Resource Sharing," Proceedings of 8th IRF International Conference, May 4, 2014, Pune, India.

Merchant, "The Design and Performance Analysis of an Arbiter for a Multi-Processor Shared-Memory System," Aug. 1984, Laboratory for Information and Decision Systems, Massachusetts Institute of Technology, Cambridge, Massachusetis 02139.

U.S. Appl. No. 17/932,084 entitled "Circuit and Method for Resource Arbitration," filed Sep. 14, 2022.

* cited by examiner

CIRCUIT AND METHOD FOR RESOURCE ARBITRATION

RELATED APPLICATIONS

This application is a continuation of U.S. application Ser. No. 17/932,084, filed on Sep. 14, 2022, now U.S. Pat. No. 11,929,940, which claims the benefit of U.S. Provisional Application No. 63/395,947, filed on Aug. 8, 2022. The entire teachings of the above applications are incorporated herein by reference.

BACKGROUND

When there is a resource that is shared by multiple requesters, it is useful to have an arbiter that accepts requests and ensures that only one requester is granted use of the resource in a specific period, typically one clock cycle for non-limiting example. Non-limiting examples of shared resources include a port, network, bus, memory, and silicon backplane.

Round robin arbitration is a commonly used arbitration policy. In a typical round robin arbitration policy, the requesters arbitrate for a token to access a shared resource and such requesters are assigned a fixed order of priority rotation. For example, the fixed order of three requesters, namely R1, R2, and R3, could be R1, R2, R3 and back to R1. With typical round robin arbitration, a requester that was granted the token in a previous clock cycle may be considered the lowest priority requester in a present clock cycle that immediately follows the previous clock cycle. A requester that immediately follows the lowest priority requester in the fixed order may be considered the highest priority requester in the present clock cycle. For example, if R2 was granted the token in the previous clock cycle, then, in the present clock cycle, R2 would be considered the lowest priority requester and R3 would be considered the highest priority requester, followed by R1 and finally R3. If R3 requests and is granted the token, then it would become the lowest priority, and the resulting arbitration order would then be R1, R2, then R3.

SUMMARY

According to an example embodiment, a circuit comprises a pending arbiter (PA) configured to output a PA selection for accessing a resource. The PA selection is based on PA input. The PA input represents respective pending-state of requesters of the resource. The circuit further comprises a valid arbiter (VA) configured to output a VA selection for accessing the resource. The VA selection is based on VA input. The VA input represents respective valid-state of the requesters. The circuit is configured to perform a validity check on the PA selection output. The circuit is further configured to output a final selection for accessing the resource by selecting, based on the validity check performed, the PA selection output or VA selection output.

A respective pending-state of a requester of the requesters may be a) independent of a respective requester-eligibility status of the requester to access the resource and b) based on a respective request status of the requester to access the resource. A respective valid-state of the requester of the requesters may be based on the respective request status and the respective requester-eligibility status.

A respective pending-state of a requester of the requesters may be pending in an event a respective request status of the requester to access the resource is pending. The respective pending-state may be non-pending in an event the respective request status is non-pending.

A respective valid-state of a requester of the requesters may be valid in an event a) a respective request status of the requester to access the resource is pending and b) a respective requester-eligibility status of the requester to access the resource is eligible. The respective valid-state may be invalid in an event c) the respective request status is non-pending or d) the respective requester-eligibility status is ineligible.

The respective requester-eligibility status may be eligible in an event the requester is allocated a credit for accessing the resource. The credit may be associated with a credit type. The credit type may be associated with a request causing the respective request status to be pending.

A respective valid-state of a requester of the requesters may be based on a respective requester-eligibility status of the requester to access the resource and the respective requester-eligibility status may be based on credit allocation for accessing the resource. The credit allocation may be to a private credit pool, the private credit pool private to the requester, or to a common credit pool, the common credit pool shared by at least a portion of the requesters.

The PA may be further configured to determine respective priorities for the requesters and the PA selection may be further based on the respective priorities determined.

The VA may be further configured to determine respective priorities for the requesters. The VA selection may be further based on the respective priorities determined.

The PA may be further configured to determine respective priorities for the requesters using a round-robin method. The PA may be further configured to halt or advance, based on the validity check performed, rotation of the respective priorities determined via the round robin method.

The VA may be further configured to determine respective priorities for the requesters using a round-robin method. The VA may be further configured to halt or advance, based on the VA input and validity check performed, rotation of the respective priorities determined via the round-robin method.

The PA selection output may represent a PA-selected requester that is selected, by the PA, from the requesters. The PA-selected requester may be associated with a) a pending request to access the resource and b) a highest priority relative to respective priorities of other requesters with a respective pending request to access the resource. The validity check performed may produce a result indicating whether the PA-selected requester is eligible to access the resource. The circuit may be further configured to select, as the final selection output, a) the PA selection output, in an event the result produced indicates that the PA-selected requester is eligible and b) the VA selection output, in an event the result produced indicates that the PA-selected requester is ineligible.

The VA selection output may represent a VA-selected requester that is selected by the VA from the requesters. The VA-selected requester may be associated with a) a pending request to access the resource, b) a credit representing eligibility to access the resource, and c) a highest priority relative to respective priorities of other requesters with a respective pending request to access the resource and a respective credit representing eligibility to access the resource.

The circuit may further comprise PA grant logic configured to perform the validity check based on the PA selection and the VA input. The PA grant logic may be further configured to output a PA grant signal representing a positive result or negative result of the validity check performed.

The circuit may further comprise output logic configured to output the final selection by selecting a) the PA selection, in an event the PA grant signal represents the positive result or b) the VA selection, in an event the PA grant signal represents the negative result. The PA selection may be further based on respective priorities of the requesters. The PA may be further configured to advance or halt rotation of the respective priorities based on the positive result or negative result, respectively, represented by the PA grant signal. The VA selection may be further based on respective priorities of the requesters. The circuit may further comprise VA grant logic configured to output a VA grant signal based on the PA grant signal and the VA input. The VA may be further configured to advance or halt rotation of the respective priorities based on the VA grant signal.

According to another example embodiment, a method comprises outputting a pending arbiter (PA) selection for accessing a resource. The PA selection is based on PA input. The PA input represents respective pending-state of requesters of the resource. The method further comprises outputting a valid arbiter (VA) selection for accessing the resource. The VA selection is based on VA input. The VA input represents respective valid-state of the requesters. The method further comprises performing a validity check on the PA selection output. The method further comprises outputting a final selection for accessing the resource by selecting, based on the validity check performed, the PA selection output or VA selection output.

Further alternative method embodiments parallel those described above in connection with the example circuit embodiment.

According to another example embodiment, a system comprises a resource, request grant logic, and a circuit. The circuit includes a pending arbiter (PA) and a valid arbiter (VA). The PA arbiter is configured to output a PA selection for accessing a resource. The PA selection is based on PA input. The PA input represents respective pending-state of requesters of the resource. The VA arbiter is configured to output a VA selection for accessing the resource. The VA selection is based on VA input. The VA input represents respective valid-state of the requesters. The circuit is configured to perform a validity check on the PA selection output. The circuit is further configured to output a final selection for accessing the resource by selecting, based on the validity check performed, the PA selection output or VA selection output. The request grant logic is configured to grant a request to access the resource. The request is received from a requester of the requesters. The request is granted based on the final selection output indicating the requester.

Further alternative system embodiments parallel those described above in connection with the example circuit embodiment.

According to another example embodiment, an apparatus comprises means for outputting a pending arbiter (PA) selection for accessing a resource. The PA selection is based on PA input. The PA input represents respective pending-state of requesters of the resource. The apparatus further comprises means for outputting a valid arbiter (VA) selection for accessing the resource. The VA selection is based on VA input. The VA input represents respective valid-state of the requesters. The apparatus further comprises means for performing a validity check on the PA selection output. The apparatus further comprises means for outputting a final selection for accessing the resource by selecting, based on the validity check performed, the PA selection output or VA selection output.

Further alternative apparatus embodiments parallel those described above in connection with the example circuit embodiment.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
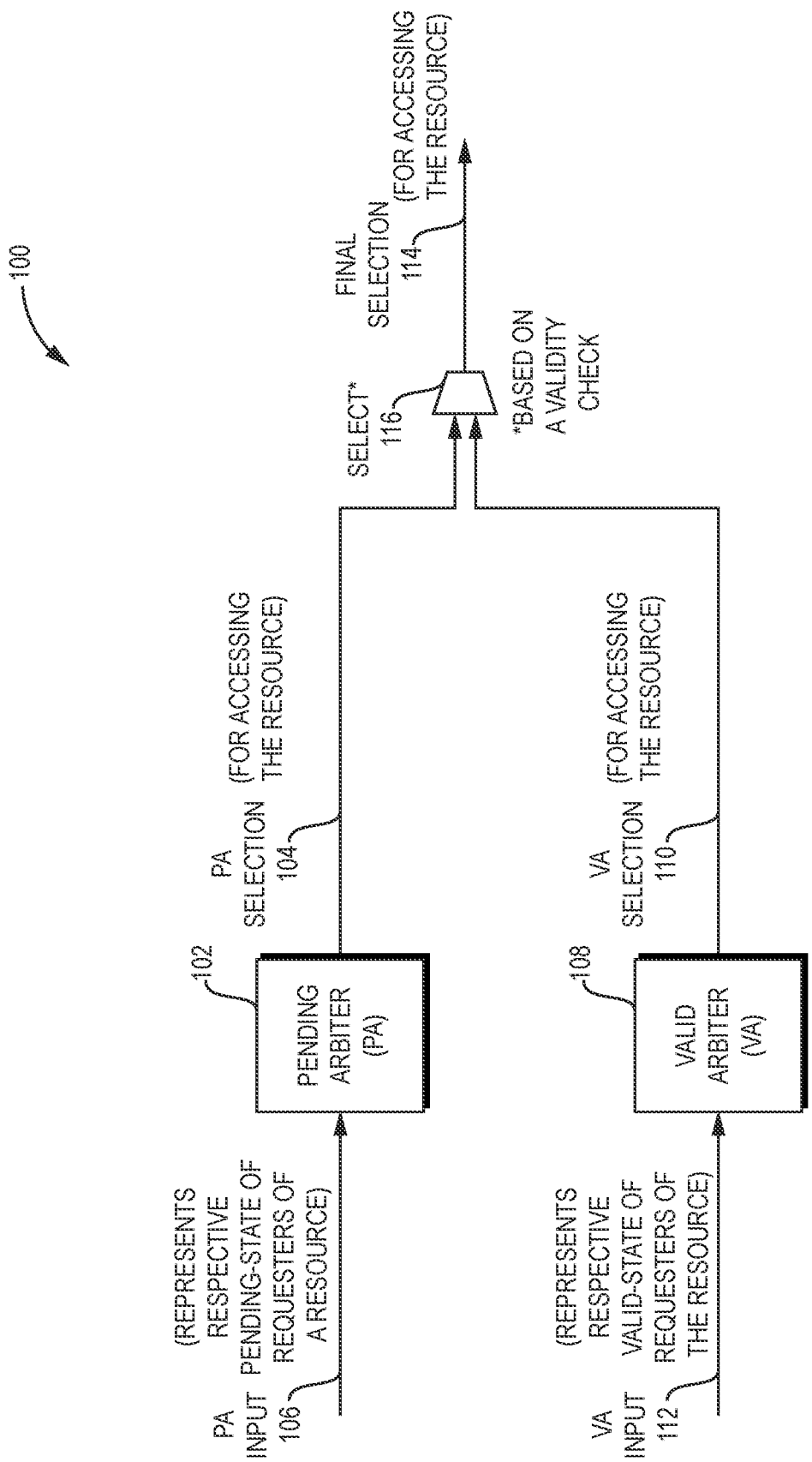
FIG. 1 is a block diagram of an example embodiment of a circuit for resource arbitration.

A description of example embodiments follows.

An example embodiment disclosed herein addresses arbitration fairness issues that may result when multiple requesters are arbitrating to be selected for access to a shared resource and such requesters require a credit (token) to be eligible for arbitration. For non-limiting example, a system may employ multiple types of credit pools, and each requester may have a request that maps to any of the types of credit pools. Successive requests from the same requester may require credits from different credit pools and such credit pools may be shared among all the requesters. Using simple round-robin arbitration for such a case has the potential for fairness issues because a requester waiting for a specific type of credit can get stuck waiting if the credit only becomes available when another requester, also waiting for that credit, has higher priority and immediately consumes the credit.

Considering a non-limiting case where there are three requesters, namely A, B, and C, and two types of credits, namely X and Y, there is a potential for fairness issues to result using round-robin arbitration. For example, both A and B may have a constant stream of requests using credit X. Requester C may have a constant stream of requests using credit Y. Credit Y may be always available; however, credit X may be only rarely available, that is, credit X may never be available in two back-to-back cycles of a clock.

In cycle 0, the priorities may be set with A>B>C, in which A has the highest priority. A will be selected, thereby consuming the X credit, and the new priorities that result will be B>C>A. In cycle 1, since credit X is no longer available, only C will be a valid requester, as C has a pending request and is eligible and, thus, is selected. The new priorities will be A>B>C. Requester C will continue to be chosen until credit X becomes available, at which point the state becomes the same as in cycle 0. If this pattern continues, B will never be selected.

An example embodiment addressing such an issue may view a requester as "valid" for selection as noted above, and introduces a new view of the requester, namely, requester "pending." A pending requester has a request that is ready to be sent. Such a requester may not, however, have the required credits. According to an example embodiment, once a requester becomes pending, it will not stop pending until it has sent the request. This is in contrast to a valid requester which may become invalid if the credits become unavailable. An example embodiment may use two states, namely a pending-state and a valid-state, associated with each requester, and two arbiters, namely a pending arbiter (PA) and a valid arbiter (VA). Such arbiters may be round-robin arbiters for non-limiting example.

If the selected output from the PA is deemed valid then it is chosen and the PA priorities are rotated. Only if the PA selection is not valid is the VA used. Further, if the PA selection is not deemed valid, the PA priorities are not changed, that is, rotation is halted. The PA arbiter ensures that when a requester is waiting for a specific credit, no other requester will be able to utilize that credit more than once before the waiting requester has a chance to use the credit. Such an implementation using the PA and VA ensures fairness of arbitration during variable periods of credit starvation when multiple requesters require credits from multiple credit types and may lead to a more uniform completion of requests across different cores and cache slices in a congested network under conditions of credit starvation. An example embodiment of a circuit that employs such a PA and VA is disclosed below with regard to FIG. 1.

FIG. 1 is a block diagram of an example embodiment of a circuit 100 for resource arbitration. The circuit 100 comprises a pending arbiter (PA) 102 configured to output a PA selection 104 for accessing a resource (not shown). Such a resource may be referred to interchangeably herein as a shared resource. The PA selection 104 is based on PA input 106. The PA input 106 represents respective pending-state (not shown) of requesters (not shown) of the resource. For example, each requester has a pending-state that corresponds to the requester. Such pending-state may be pending or non-pending, as disclosed further below. Since the PA input 106 represents the respective pending-state of the requesters, the PA input 106 represents the pending-state of each requester. The circuit 100 further comprises a valid arbiter (VA) 108 configured to output a VA selection 110 for accessing the resource. The VA selection 110 is based on VA input 112. The VA input 112 represents respective valid-state of the requesters. For example, each requester has a valid-state that corresponds to the requester. Such valid-state may be valid or invalid, as disclosed further below. Since the VA input 112 represents the respective valid-state of the requesters, the VA input 112 represents the valid-state of each requester. The circuit 100 is configured to perform a validity check (not shown) on the PA selection 104 output. The circuit 100 is further configured to output a final selection 114 for accessing the resource. To output the final selection 114, the circuit 100 is further configured to select 116, based on the validity check performed, the PA selection 104 output or VA selection 110 output.

According to a non-limiting example, the PA selection 104, VA selection 110, and final selection 114 may be represented as respective one-hot vectors within which each respective bit corresponds to a requester of the requesters and only a single bit may be asserted, thereby identifying, at most, a single requester.

According to an example embodiment, respective pending-state of a requester of the requesters may be a) independent of a respective requester-eligibility status of the requester to access the resource and b) based on a respective request status of the requester to access the resource. A respective valid-state of the requester of the requesters may be based on the respective request status and the respective requester-eligibility status, as disclosed below with regard to FIG. 2.

Figure 2:
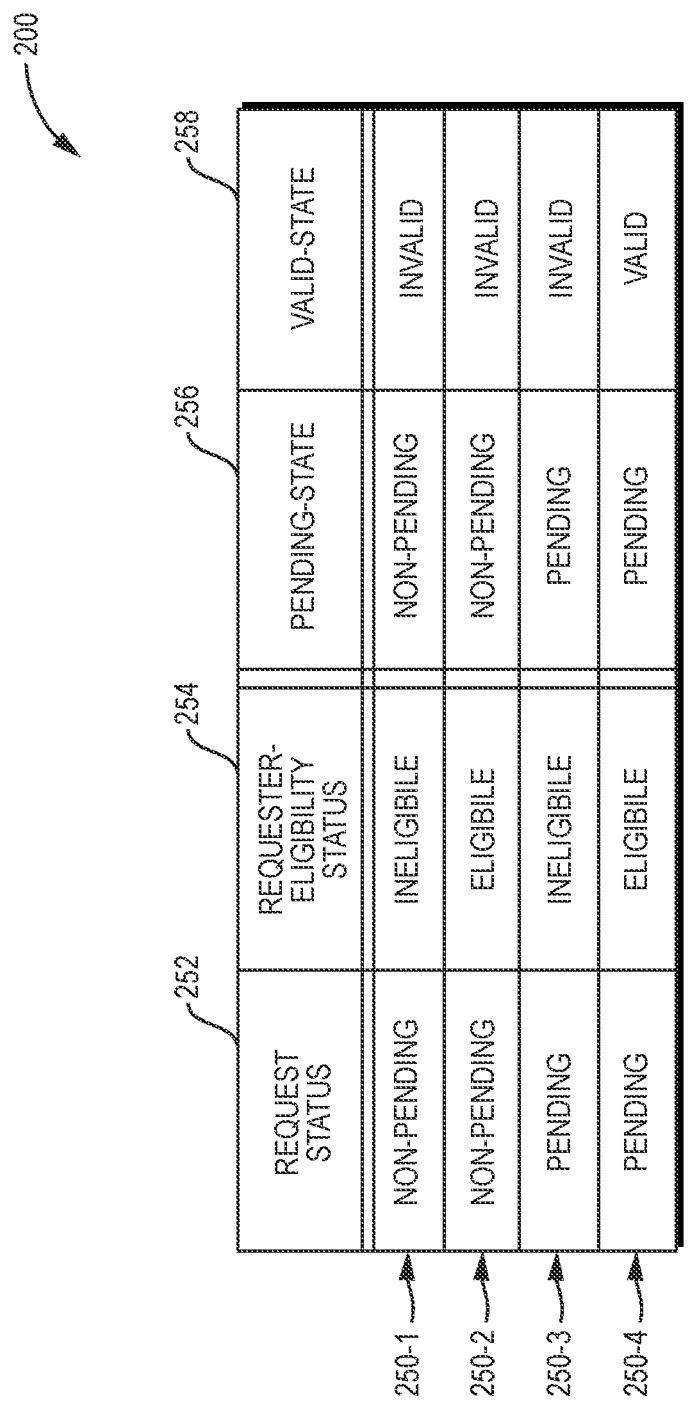
FIG. 2 is a table with example embodiments of status and state.

FIG. 2 is a table 200 with example embodiments of status and state of a requester that may be employed by the circuit of FIG. 1. The table 200 includes rows (250-1, 250-2, 250-3, 250-4) that indicate the request status 252, requester-eligibility status 254, pending-state 256, and valid-state 258 of a requester (not shown). In the example embodiment of FIG. 2, the request status 252 may be pending or non-pending and the requester-eligibility status 254 may be eligible or ineligible. The pending-state 256 may be pending or non-pending and the valid-state 258 may be valid or invalid.

The request status 252 of the requester may be pending in an event there is a request pending from the requester to access a resource (not shown) and non-pending, otherwise. The requester-eligibility status 254 may be eligible in an event the requester is allocated a credit (not shown) for accessing the resource. The credit may be associated with a credit type. The credit type may be associated with a request causing the request status 252 to be pending.

The pending-state 256 of the requester is pending in an event the request status 252 of the requester to access the resource is pending, such as shown in the third row 250-3 and fourth row 250-4. The pending-state 256 is non-pending in an event the request status 252 is non-pending, such as shown in the first row 250-1 and second row 250-2. As shown in the table 200, the pending-state 256 of the requester is a) independent of the requester-eligibility status 254 and b) based on the request status 252 of the requester to access the resource.

As shown in the fourth row 250-4 of the table 200, the valid-state 258 of the requester is valid in an event a) the request status 252 of the requester pending and b) the requester-eligibility status 254 of the requester to access the resource is eligible. The valid-state 258 is invalid in an event c) the request status 252 is non-pending or d) the requester-eligibility status 254 is ineligible. The valid-state 258 is invalid in the third row 250-3 of the table 200 since the requester-eligibility status 254 is ineligible.

The valid-state 258 of the requester may be based on the requester-eligibility status 254 of the requester to access the resource and the requester-eligibility status 254 may be based on credit allocation for accessing the resource. The credit allocation may be to a private credit pool (not shown) that is private to the requester. Alternatively, or in addition, the credit allocation may be to a common credit pool wherein the common credit pool is shared by the requester and at least one other requester (not shown). The valid-state 258 and the pending state 256 may be represented in the VA input 112 and PA input 106, respectively, disclosed above with regard to FIG. 1.

Continuing with reference to FIG. 1, the PA 102 may be further configured to determine respective priorities (not shown) for the requesters and the PA selection 104 may be further based on the respective priorities determined. Such respective priorities determined by the PA may be referred to interchangeably herein as respective PA priorities. The PA 102 may, for non-limiting example, be further configured to determine the respective PA priorities for the requesters using a round-robin method known in the art. The PA 102 may be further configured to halt or advance, based on the validity check performed, rotation of the respective PA priorities determined via the round robin method.

The VA 108 may be further configured to determine respective priorities (not shown) for the requesters and the VA selection 110 may be further based on the respective priorities determined. Such respective priorities determined by the VA 108 may be referred to interchangeably herein as respective VA priorities. The VA 108 may, for non-limiting example, be further configured to determine the respective VA priorities for the requesters using a round-robin method known in the art. The VA may be further configured to halt or advance, based on the VA input and validity check performed, rotation of the respective VA priorities determined via the round-robin method.

The PA selection 104 output by the PA 102 may represent a PA-selected requester (not shown) that is selected, by the PA 102, from the requesters. The PA-selected requester may be associated with a) a pending request (not shown) to access the resource and b) a highest priority relative to respective priorities of other requesters with a respective pending request to access the resource. The validity check performed may produce a result (not shown) that indicates whether the PA-selected requester is eligible to access the resource. The circuit 100 may be further configured to select, as the final selection 114 output, a) the PA selection 104 output, in an event the result produced indicates that the PA-selected requester is eligible and b) the VA selection 110 output, in an event the result produced indicates that the PA-selected requester is ineligible.

The VA selection 110 output may represent a VA-selected requester (not shown), selected by the VA 108 from the requesters. The VA-selected requester may be associated with a) a pending request to access the resource, b) a credit (not shown) representing eligibility to access the resource, and c) a highest priority relative to respective priorities of other requesters with a respective pending request to access the resource and a respective credit representing eligibility to access the resource. As disclosed above, the circuit 100 is configured to select 116, based on the validity check performed, the PA selection 104 output or the VA selection 110 output. According to an example embodiment, the validity check may be performed via grant logic, such as disclosed below with regard to FIG. 3.

Figure 3:
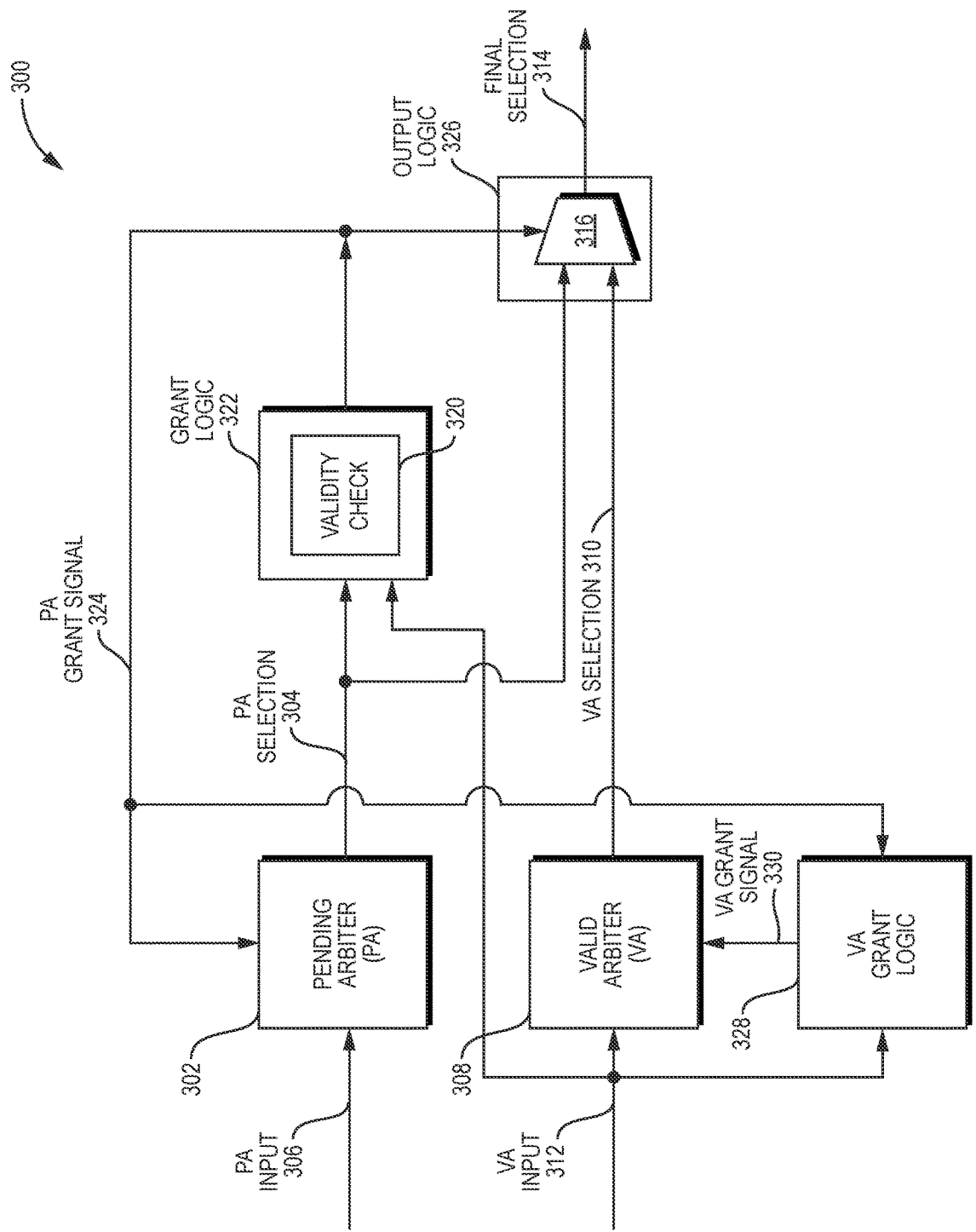
FIG. 3 is a block diagram of an example embodiment of another circuit for resource arbitration.

FIG. 3 is a block diagram of an example embodiment of another circuit 300 for resource arbitration. The circuit 300 may be employed as the circuit 100 of FIG. 1, disclosed above. Continuing with reference to FIG. 3, the circuit 300 comprises a pending arbiter (PA) 302 configured to output a PA selection 304 for accessing a resource (not shown). The PA selection 304 is based on PA input 306. The PA input 306 represents respective pending-state (not shown) of requesters (not shown) of the resource. The circuit 300 further comprises a valid arbiter (VA) 308 configured to output a VA selection 310 for accessing the resource. The VA selection 310 is based on VA input 312. The VA input 312 represents respective valid-state of the requesters. The circuit 300 is configured to perform a validity check 320 on the PA selection 304 output. The circuit 300 is further configured to output a final selection 314 for accessing the resource. To output the final selection 314, the circuit 300 is further configured to select 316, based on the validity check 320 performed, the PA selection 304 output or VA selection 310 output.

The circuit 300 may further comprise PA grant logic 322 configured to perform the validity check 320 based on the PA selection 304 and the VA input 312. The PA grant logic 322 may be further configured to output a PA grant signal 324 representing a positive result or negative result of the validity check 320 performed.

The circuit 300 may further comprise output logic 326 configured to output the final selection 314 by selecting a) the PA selection 304, in an event the PA grant signal 324 represents the positive result or b) the VA selection 310, in an event the PA grant signal 324 represents the negative result. The PA selection 304 may be further based on respective priorities (not shown) of the requesters. The PA 302 may be further configured to advance or halt rotation of the respective priorities based on the positive result or negative result, respectively, represented by the PA grant signal 324. The VA selection 310 may be further based on respective priorities (not shown) of the requesters.

The circuit 300 may further comprise VA grant logic 328 configured to output a VA grant signal 330 based on the PA grant signal 324 and the VA input 312. The VA 308 may be further configured to advance or halt rotation of the respective priorities based on the VA grant signal 330. Example embodiments of logic for generating the PA grant signal 324 and VA grant signal 330 are disclosed below with regard to FIG. 4 and FIG. 5, respectively.

Figure 4:
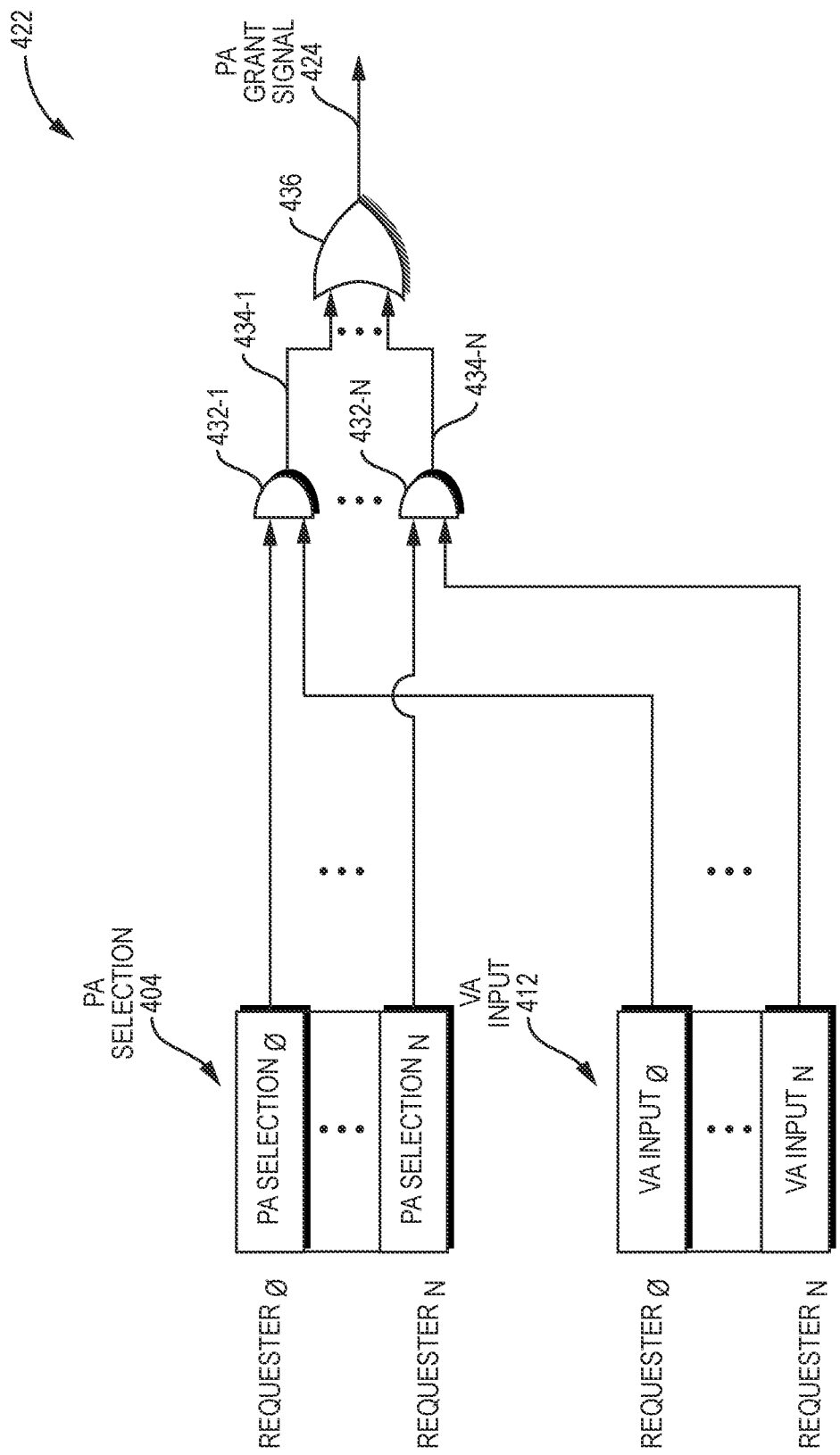
FIG. 4 is a schematic diagram of an example embodiment of pending arbiter (PA) grant logic.

FIG. 4 is a schematic diagram of an example embodiment of pending arbiter (PA) grant logic 422. It should be understood that the logic of the PA grant logic 422 is for non-limiting example and that alternative hardware logic may be employed to perform an equivalent function.

The PA grant logic 422 may be employed as the PA grant logic 322 of FIG. 3, disclosed above. Continuing with reference to FIG. 3 and FIG. 4, the PA grant logic 422 is configured to perform the validity check 320 based on the PA selection 404 and the VA input 412, that may be the PA selection 304 and VA input 312, respectively. The PA grant logic 422 is further configured to output a PA grant signal 424 representing a positive result or negative result of the validity check 320 performed. The PA grant signal 424 may be employed as the PA grant signal 324.

In the example embodiment of FIG. 4, the PA selection 404 is a one-hot vector that includes a plurality of PA selection bits (PA selection$_0$, . . . , PA selection$_N$), wherein each PA selection bit of the plurality of PA selection bits corresponds to a respective requester of the requesters (Requester$_0$, . . . , Requester$_N$). The one-hot vector is configured by the PA 302 to have a value of 1 in the bit corresponding to the PA-selected requester, disclosed above, and zeros elsewhere, for non-limiting example.

The VA input 412 is a vector that includes a plurality of VA input bits (VA input$_0$, . . . , VA input$_N$), wherein each VA input bit of the plurality of VA input bits corresponds to a respective requester of the requesters (Requester$_0$, . . . , Requester$_N$). Such a vector, that is, a vector representing the VA input, may be referred to interchangeably herein as a valid input vector. The valid input vector is configured by the circuit 300 to have a 1 in each bit that corresponds to a requester with a request that it has all the credits for, that is, in an event the requester is associated with a request status that is set to pending and a requester-eligibility status that is set to eligible.

In the example embodiment of FIG. 4, the PA grant logic 422 includes a plurality of AND gates (432-1, . . . , 432-N)

and each AND gate is configured to perform a logical AND of a unique PA selection bit of the plurality of PA selection bits (PA selection$_0$, . . . , PA selection$_N$) and a unique VA input bit of the plurality of VA input bits (VA input$_0$, . . . , VA input$_N$), wherein the unique PA selection bit and unique VA input bit correspond to a same unique requester of the plurality of requesters (Requester$_0$, . . . , Requester$_N$). Respective outputs (431-1, . . . , 434-N) of the plurality of AND gates (432-1, . . . , 432-N) represent respective bits of an output vector and the PA grant logic 422 is configured to perform a logical OR of such bits, for non-limiting example, via the OR gate 436 and a result of the logical OR may be the PA grant signal 424 that may be employed as the PA grant signal 324. For non-limiting example, if the PA grant signal 424 has a value of 1, the PA grant signal 424 represents a positive result and if the PA grant signal 424 has a value of 0, the PA grant signal 424 represents a negative result. The PA grant signal 424 may be employed in generating the VA grant signal 330, such as disclosed below with regard to FIG. 5.

Figure 5:
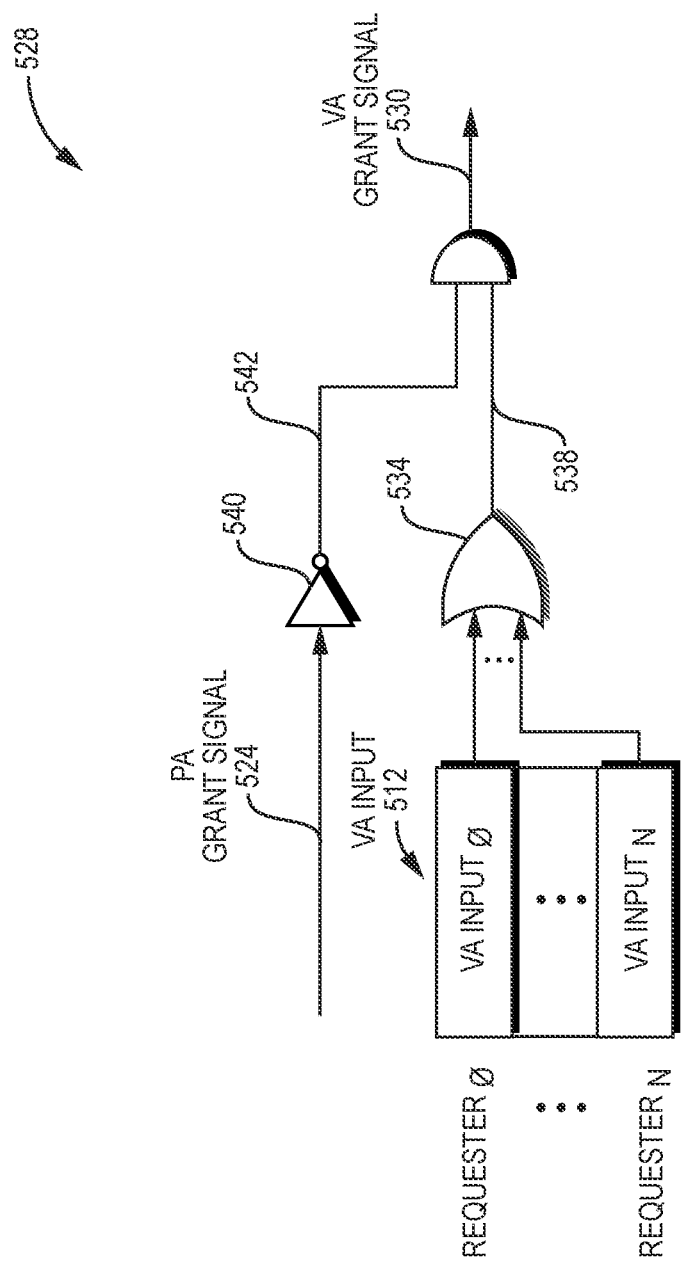
FIG. 5 is a schematic diagram of an example embodiment of valid arbiter (VA) grant logic.

FIG. 5 is a schematic diagram of an example embodiment of VA grant logic 528. The VA grant logic 528 may be employed as the VA grant logic 328 of FIG. 3, disclosed above. With reference to FIGS. 3, 4, and 5, the VA grant logic 528 is configured to output a VA grant signal 530 based on the PA grant signal 524 and the VA input 512. The PA grant signal 524 may be the PA grant signal 324 or PA grant signal 424. The VA input 512 may be the VA input 312 or VA input 412. The VA grant signal 530 may be employed as the VA grant signal 330.

In the example embodiment of FIG. 5, the VA input 512 is a vector that includes a plurality of VA input bits (VA input$_0$, . . . , VA input$_N$), wherein each VA input bit of the plurality of VA input bits corresponds to a respective requester of the requesters (Requester$_0$, . . . , Requester$_N$), and may be referred to interchangeably herein as a valid input vector or, simply, a valid vector. The valid input vector is configured by the circuit 300 to have a 1 in each bit that corresponds to a requester with a request that it has all the credits for, that is, in an event the requester is associated with a request status that is set to pending and a requester-eligibility status that is set to eligible.

The VA grant logic 528 is configured to compress the valid input vector to a single bit by performing a logical OR over all the bits of such vector. For non-limiting example, the VA grant logic 528 includes an OR gate 534 configured to perform same and output a compressed version 538 of the VA input 512. The VA grant logic further includes an inverter 540 configured to invert the PA grant signal 524 and produce an inverted version 542 of the PA grant signal 524. The VA grant logic 528 is further configured to perform a logical AND of a) the inverted version 542 of the PA grant signal 524 and b) the compressed version 538 of the VA input 512 in order to produce the VA grant signal 530 that may have a value of 0 or 1 for non-limiting example. The value of 0 may halt the VA arbiter 308 from rotating respective priorities of the requesters, as disclosed above. It should be understood that the logic of the VA grant logic 528 is for non-limiting example and that alternative hardware logic may be employed to perform an equivalent function.

Figure 6:
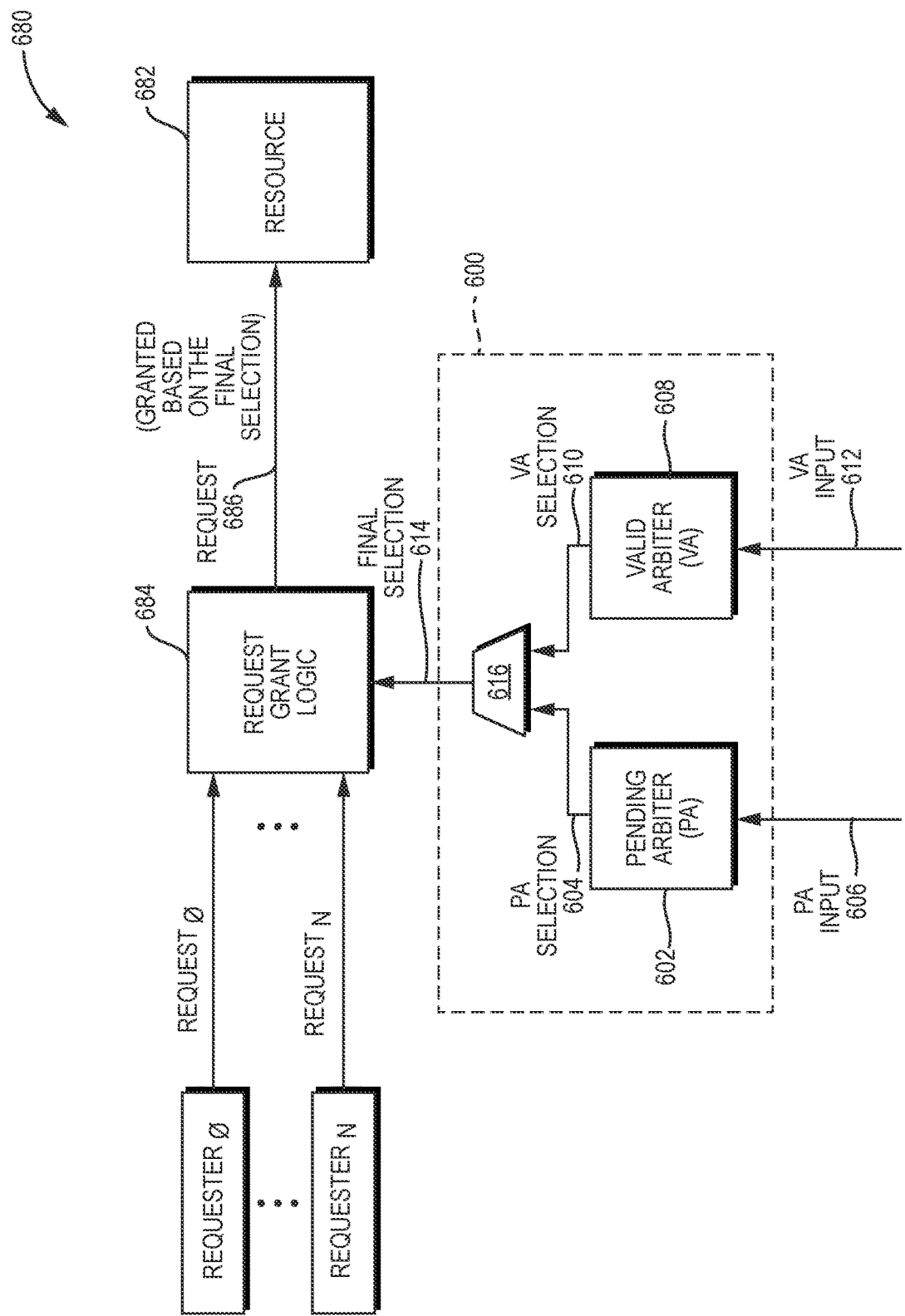
FIG. 6 is a block diagram of an example embodiment of system.

FIG. 6 is a block diagram of an example embodiment of a system 680. The system 680 comprises a resource 682, request grant logic 684, and a circuit 600. The circuit 600 includes a pending arbiter (PA) 602 and a valid arbiter (VA) 608. The PA arbiter 602 is configured to output a PA selection 604 for accessing a resource 682. The PA selection 604 is based on PA input 606. The PA input 606 represents respective pending-state of requesters (Requester$_0$, . . . , Requester$_N$) of the resource 682. The VA arbiter 608 is configured to output a VA selection 610 for accessing the resource 682. The VA selection 610 is based on VA input 612. The VA input 612 represents respective valid-state (not shown) of the requesters (Requester$_0$, . . . , Requester$_N$). The circuit 600 is configured to perform a validity check (not shown) on the PA selection 604 output. The circuit 600 is further configured to output a final selection 614 for accessing the resource 682 by selecting 616, based on the validity check performed, the PA selection 604 output or VA selection 610 output. The request grant logic 684 is configured to grant a request 686 to access the resource 682. The request 686 is received from a requester of the requesters (Requester$_0$, . . . , Requester$_N$). The request 686 is granted based on the final selection 614 output indicating the requester. The circuit 600 may be the circuit 100 or circuit 300 of FIG. 1 and FIG. 3, respectively, disclosed above.

Figure 7:
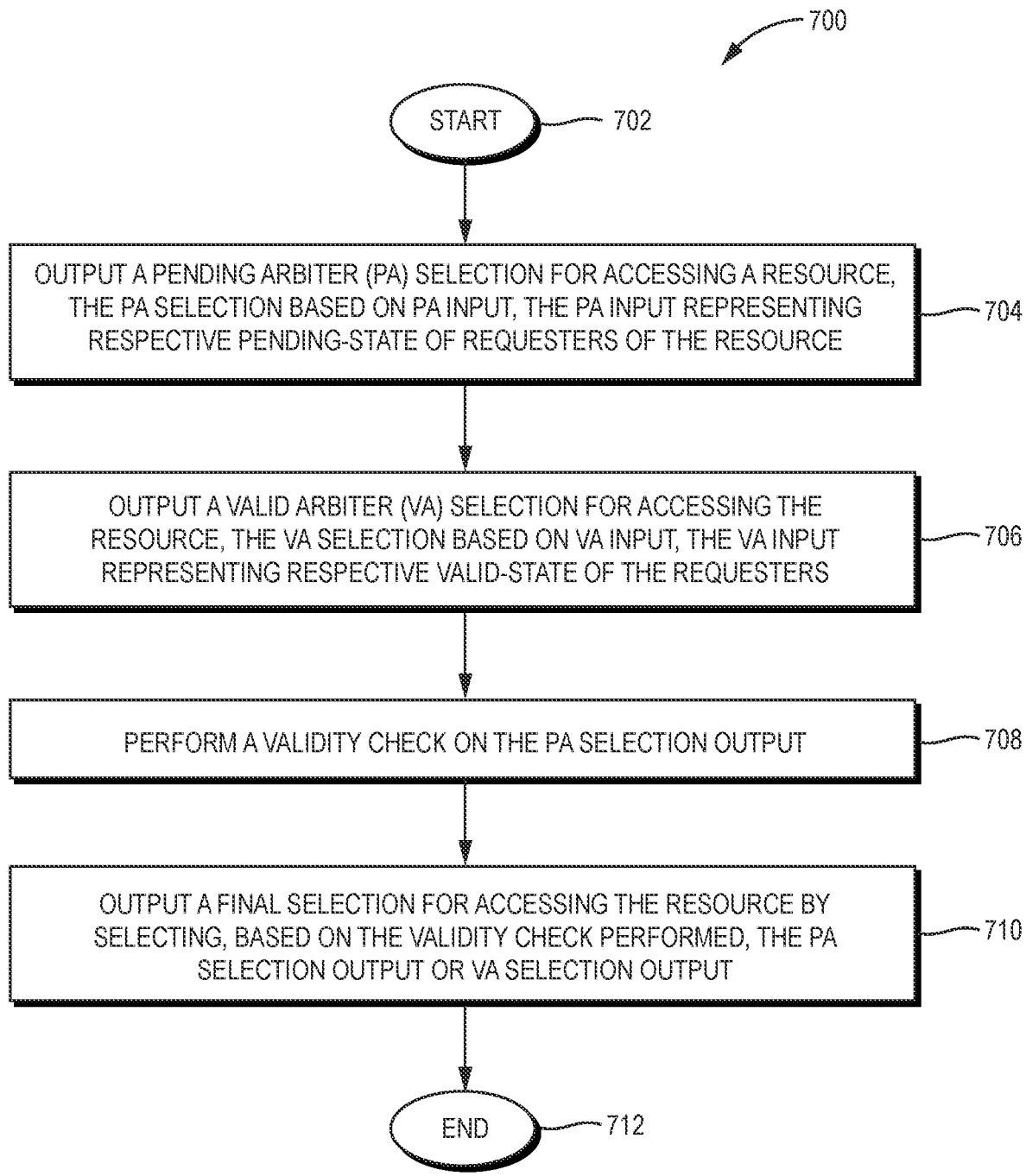
FIG. 7 is a flow diagram of an example embodiment of a method for performing resource arbitration.

FIG. 7 is a flow diagram of a method (700) for performing resource arbitration. The method begins (702) and comprises outputting a pending arbiter (PA) selection for accessing a resource, the PA selection based on PA input, the PA input representing respective pending-state of requesters of the resource (704). The method further comprises outputting a valid arbiter (VA) selection for accessing the resource, the VA selection based on VA input, the VA input representing respective valid-state of the requesters (706). The method further comprises performing a validity check on the PA selection output (708). The method further comprises outputting a final selection for accessing the resource by selecting, based on the validity check performed, the PA selection output or VA selection output (710). The method thereafter ends (712) in the example embodiment.

The elements of the block and flow diagrams described herein may be combined or divided in any manner in software, hardware, or firmware. If implemented in software, the software may be written in any language that can support the example embodiments disclosed herein. The software may be stored in any form of computer readable medium, such as random-access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A circuit comprising:
   a pending arbiter (PA) configured to output a PA selection for accessing a resource; and
   a valid arbiter (VA) configured to output a VA selection for accessing the resource, the circuit configured to (i) perform a validity check on the PA selection output and (ii) output a final selection for accessing the resource by selecting, based on the validity check performed, between the PA selection output and the VA selection output.

2. The circuit of claim 1, wherein:
the PA selection is based on a respective pending-state of a requester of the requesters and the respective pending-state is a) independent of a respective requester-eligibility status of the requester to access the resource and b) based on a respective request status of the requester to access the resource; and
the VA selection is based on a respective valid-state of the requester of the requesters and the respective valid-state is based on the respective request status and the respective requester-eligibility status.

3. The circuit of claim 1, wherein:
the PA selection is based on a respective pending-state of a requester of the requesters and the respective pending-state is pending in an event a respective request status of the requester to access the resource is pending; and
the respective pending-state is non-pending in an event the respective request status is non-pending.

4. The circuit of claim 1, wherein:
the VA selection is based on a respective valid-state of a requester of the requesters and the respective valid-state is valid in an event a) a respective request status of the requester to access the resource is pending and b) a respective requester-eligibility status of the requester to access the resource is eligible; and
the respective valid-state is invalid in an event c) the respective request status is non-pending or d) the respective requester-eligibility status is ineligible.

5. The circuit of claim 4, wherein the respective requester-eligibility status is eligible in an event the requester is allocated a credit for accessing the resource.

6. The circuit of claim 5, wherein the credit is associated with a credit type and wherein the credit type is associated with a request, the request causing the respective request status to be pending.

7. The circuit of claim 1, wherein the VA selection is based on a respective valid-state of a requester of the requesters and the respective valid-state is based on a respective requester-eligibility status of the requester to access the resource and wherein the respective requester-eligibility status is based on credit allocation for accessing the resource.

8. The circuit of claim 7, wherein the credit allocation is to a private credit pool, the private credit pool private to the requester, or to a common credit pool, the common credit pool shared by at least a portion of the requesters.

9. The circuit of claim 1, wherein the PA is further configured to determine respective priorities for the requesters and wherein the PA selection is based on the respective priorities determined.

10. The circuit of claim 1, wherein the VA is further configured to determine respective priorities for the requesters and wherein the VA selection is based on the respective priorities determined.

11. The circuit of claim 1, wherein the PA is further configured to:
determine respective priorities for the requesters using a round-robin method; and
halt or advance, based on the validity check performed, rotation of the respective priorities determined via the round robin method.

12. The circuit of claim 1, wherein the VA is further configured to:
determine respective priorities for the requesters using a round-robin method; and
halt or advance, based on the VA input and validity check performed, rotation of the respective priorities determined via the round-robin method.

13. The circuit of claim 1, wherein:
the PA selection output represents a PA-selected requester, selected by the PA from the requesters, the PA-selected requester associated with a) a pending request to access the resource and b) a highest priority relative to respective priorities of other requesters with a respective pending request to access the resource;
the validity check performed produces a result indicating whether the PA-selected requester is eligible to access the resource; and
the circuit is further configured to select, as the final selection output, a) the PA selection output, in an event the result produced indicates that the PA-selected requester is eligible and b) the VA selection output, in an event the result produced indicates that the PA-selected requester is ineligible.

14. The circuit of claim 1, wherein the VA selection output represents a VA-selected requester, selected by the VA from the requesters, the VA-selected requester associated with a) a pending request to access the resource, b) a credit representing eligibility to access the resource, and c) a highest priority relative to respective priorities of other requesters with a respective pending request to access the resource and a respective credit representing eligibility to access the resource.

15. The circuit of claim 1, further comprising PA grant logic configured to:
perform the validity check based on the PA selection and VA input; and
output a PA grant signal representing a positive result or negative result of the validity check performed.

16. The circuit of claim 15, wherein the circuit further comprises output logic configured to output the final selection by selecting a) the PA selection, in an event the PA grant signal represents the positive result or b) the VA selection, in an event the PA grant signal represents the negative result.

17. The circuit of claim 15, wherein the PA selection is based on respective priorities of the requesters and wherein the PA is further configured to advance or halt rotation of the respective priorities based on the positive result or negative result, respectively, represented by the PA grant signal.

18. The circuit of claim 15, wherein the VA selection is based on respective priorities of the requesters, wherein the circuit further comprises VA grant logic configured to output a VA grant signal based on the PA grant signal and VA input, and wherein the VA is further configured to advance or halt rotation of the respective priorities based on the VA grant signal.

19. A method comprising:
outputting a pending arbiter (PA) selection for accessing a resource;
outputting a valid arbiter (VA) selection for accessing the resource;
performing a validity check on the PA selection output; and
outputting a final selection for accessing the resource by selecting, based on the validity check performed, between the PA selection output and the VA selection output.

20. The method of claim 19, wherein:
the PA selection is based on a respective pending-state of a requester of the requesters and the respective pending-state is a) independent of a respective requester-eligibility status of the requester to access the resource and b) based on a respective request status of the requester to access the resource; and the VA selection is based on a respective valid-state of the requester of the requesters and the respective valid-state is based on the respective request status and the respective requester-eligibility status.

21. The method of claim 19, wherein:
the PA selection is based on a respective pending-state of a requester of the requesters and the respective pending-state is pending in an event a respective request status of the requester to access the resource is pending; and the respective pending-state is non-pending in an event the respective request status is non-pending.

22. The method of claim 19, wherein:
the VA selection is based on a respective valid-state of a requester of the requesters and the respective valid-state is valid in an event a) a respective request status of the requester to access the resource is pending and b) a respective requester-eligibility status of the requester to access the resource is eligible; and the respective valid-state is invalid in an event c) the respective request status is non-pending or d) the respective requester-eligibility status is ineligible.

23. The method of claim 22, wherein the respective requester-eligibility status is eligible in an event the requester is allocated a credit for accessing the resource.

24. The method of claim 23, wherein the credit is associated with a credit type and wherein the credit type is associated with a request, the request causing the respective request status to be pending.

25. The method of claim 19, wherein the VA selection is based on a respective valid-state of a requester of the requesters and the respective valid-state is based on a respective requester-eligibility status of the requester to access the resource and wherein the respective requester-eligibility status is based on credit allocation for accessing the resource.

26. The method of claim 25, wherein the credit allocation is to a private credit pool, the private credit pool private to the requester, or to a common credit pool, the common credit pool shared by at least a portion of the requesters.

27. The method of claim 19, further comprising determining respective priorities for the requesters and wherein the PA selection is based on the respective priorities determined.

28. The method of claim 19, further comprising determining respective priorities for the requesters and wherein the VA selection is further based on the respective priorities determined.

29. The method of claim 19, further comprising:
determining respective priorities for the requesters using a round-robin method; and
halting or advancing, based on the validity check performed, rotation of the respective priorities determined via the round robin method.

30. The method of claim 19, further comprising:
determining respective priorities for the requesters using a round-robin method; and
halting or advancing, based on VA input and the validity check performed, rotation of the respective priorities determined via the round-robin method, the VA input representing respective valid-state of the requesters.

31. The method of claim 19, wherein the PA selection output represents a PA-selected requester selected from the requesters, the PA-selected requester associated with a) a pending request to access the resource and b) a highest priority relative to respective priorities of other requesters with a respective pending request to access the resource and wherein the method further comprises:
producing, via the validity check, a result indicating whether the PA-selected requester is eligible to access the resource; and
selecting, as the final selection output, a) the PA selection output, in an event the result produced indicates that the PA-selected requester is eligible and b) the VA selection output, in an event the result produced indicates that the PA-selected requester is ineligible.

32. The method of claim 19, wherein the VA selection output represents a VA-selected requester selected from the requesters, the VA-selected requester associated with a) a pending request to access the resource, b) a credit representing eligibility to access the resource, and c) a highest priority relative to respective priorities of other requesters with a respective pending request to access the resource and a respective credit representing eligibility to access the resource.

33. The method of claim 19, performing the validity check based on the PA selection and VA input and outputting a PA grant signal representing a positive result or negative result of the validity check performed, the VA input representing respective valid-state of the requesters.

34. The method of claim 33, further comprising outputting the final selection by selecting a) the PA selection, in an event the PA grant signal represents the positive result or b) the VA selection, in an event the PA grant signal represents the negative result.

35. The method of claim 33, wherein the PA selection is based on respective priorities of the requesters and wherein the method further comprises advancing or halting rotation of the respective priorities based on the positive result or negative result, respectively, represented by the PA grant signal.

36. The method of claim 33, wherein the VA selection is based on respective priorities of the requesters and wherein the method further comprises:
outputting a VA grant signal based on the PA grant signal and VA input, the VA input representing respective valid-state of the requesters; and
advancing or halting rotation of the respective priorities based on the VA grant signal.

37. A system comprising:
a resource;
request grant logic; and
a circuit including a pending arbiter (PA) and a valid arbiter (VA), the PA arbiter configured to output a PA selection for accessing a resource, the valid arbiter (VA) configured to output a VA selection for accessing the resource,
the circuit configured to (i) perform a validity check on the PA selection output and (ii) output a final selection for accessing the resource by selecting, based on the validity check performed, between the PA selection output and the VA selection output,
the request grant logic configured to grant a request to access the resource, the request received from a requester of the requesters, the request granted based on the final selection output indicating the requester.

38. An apparatus comprising:
means for outputting a pending arbiter (PA) selection for accessing a resource;

means for outputting a valid arbiter (VA) selection for accessing the resources;

means for performing a validity check on the PA selection output; and means for outputting a final selection for accessing the resource by selecting, based on the validity check performed, between the PA selection output and the VA selection output.

* * * * *